(No Model.)

L. T. HARDY.
CATTLE GUARD.

No. 325,606. Patented Sept. 1, 1885.

WITNESSES:
W. W. Hollingsworth
Edw. W. Byrn

INVENTOR:
L. T. Hardy
BY Munn & Co.
ATTORNEYS.

United States Patent Office.

LESLIE TALBOT HARDY, OF HOUSTON MINES, VIRGINIA, ASSIGNOR OF TWO-THIRDS TO RUFUS P. KYLE AND JACOB DANNER, OF SAME PLACE.

CATTLE-GUARD.

SPECIFICATION forming part of Letters Patent No. 325,606, dated September 1, 1885.

Application filed July 11, 1884. (No model.)

*To all whom it may concern:*

Be it known that I, LESLIE T. HARDY, a citizen of the United States, residing at Houston Mines, in the county of Botetourt and State of Virginia, have invented certain new and useful Improvements in Cattle-Guards, of which the following is a description.

Figure 1:
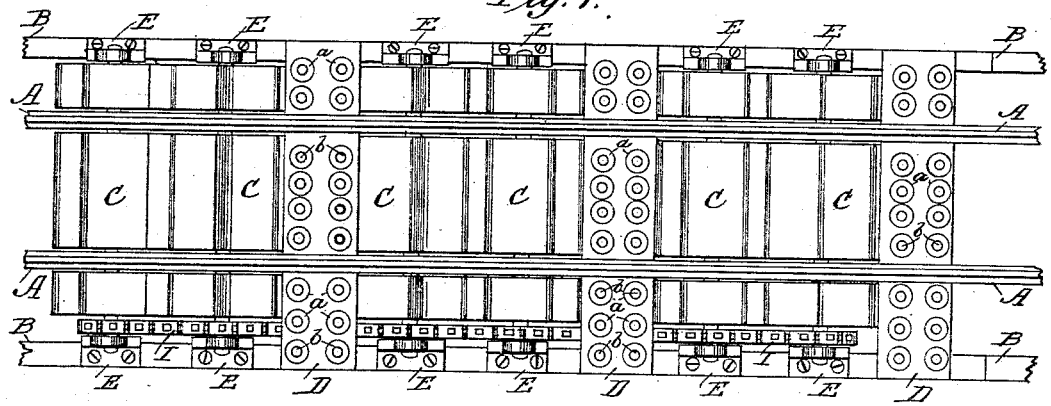
Figure 2:
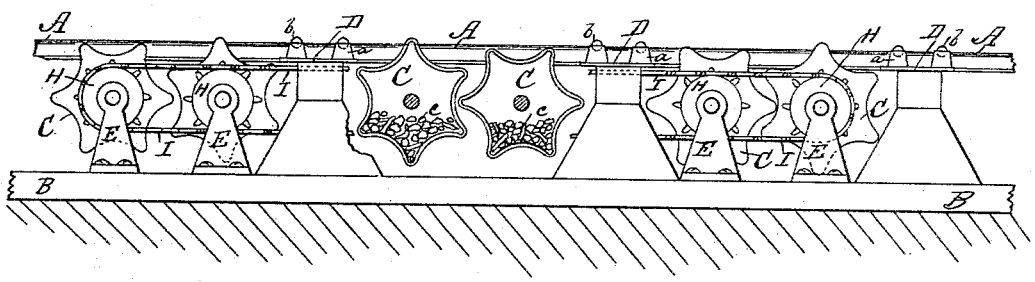

Figure 1 is a plan of the cattle-guard applied to a railroad-track. Fig. 2 is a side view of the same, with two of the cylinders broken open or in section.

The object of my invention is to provide a cattle-guard for railroad-tracks which will prevent cattle from passing from one field into another or from a field into a road at the point where the continuity of the fence is broken by a railroad-track.

My invention relates to that form of cattle-guard in which a series of rollers are arranged in bearings in the track-bed, and in revolving, from contact with the hoof of the animal, deters the latter from passing over.

My invention consists in constructing these rollers in the shape of hollow cylinders, and placing within the same resonant fragments of metal or other material, which, when agitated by the motion of the cylinder, frightens animals back.

It also consists in constructing said cylinders with longitudinal flutes, which cause them to be more positively revolved by the animal, and also serve to increase the agitation and noise of its contents.

It also further consists in gearing all the cylinders together for cumulative effect, and still further in providing intermediate cones with revolving or stationary balls for preventing the animal from finding a foothold between the cylinders, as hereinafter fully described.

In the drawings, A A represent the railroad-track-rails. B B are sills arranged outside the track-rails and parallel with them. C are the revolving cylinders, which are made of any suitable material, and are formed with longitudinal flutes in their peripheries, which are concave upon the outside and convex upon the inside, forming a sort of hexagonal cylinder. These cylinders are journaled in bearings E, in the sills B, and are coupled together by chain-wheels H and chains I, so that they may all revolve together. D are plates placed between the cylinders and parallel with and just above the cross-ties, which plates are provided with numerous cone-like projections, $a$, which have knobs or balls $b$ at their upper ends, which, by preference, are made to revolve.

Within each cylinder is placed a quantity of resonant material, $c$, such as metal scraps, broken glass, &c., which, when the cylinders are turned by the foot of the animal, produces a noise or racket that alarms the animal and causes it to back out.

In defining my invention with greater clearness, I would state that I am aware that revolving rollers have been heretofore employed in a railroad-track bed, and I do not claim these broadly.

In modifying my invention I may prefer to use self-gearing cylinders, or cylinders whose longitudinal wings or flutes gear into each other. I may also use cylinders and plates in other relation than that mentioned.

Having thus described my invention, what I claim as new is—

1. A cattle-guard for railway-tracks, consisting of a series of revolving cylinders or chambers having within the same resonant material, which is set in agitation by the movement of the cylinder, as described.

2. A cattle-guard for railway-tracks, consisting of a series of revolving cylinders or rollers, combined with chain-wheels and a chain for gearing them to revolve together.

3. A cattle-guard for railway-tracks, consisting of the hollow cylinder C, having longitudinal flutes, concaved on the outside and convex on the inside, containing a resonant filling, $c$, as and for the purpose described.

4. A cattle-guard for railway-tracks, consisting of the combination, with the revolving cylinders or rollers, of the intermediate plates, D, having cone-like projections $a$, with knobs or balls $b$, as and for the purpose described.

LESLIE TALBOT HARDY.

Witnesses:
J. H. H. FIGGAT.
J. T. SKUE.